United States Patent
Yoshida

(10) Patent No.: US 11,898,531 B2
(45) Date of Patent: Feb. 13, 2024

(54) VARIABLE SPEED PUMPING SYSTEMS

(71) Applicant: HITACHI MITSUBISHI HYDRO CORPORATION, Tokyo (JP)

(72) Inventor: Masahiro Yoshida, Tokyo (JP)

(73) Assignee: HITACHI MITSUBISHI HYDRO CORPORATION, Tokyo (JP)

( * ) Notice: Subject to any disclaimer, the term of this patent is extended or adjusted under 35 U.S.C. 154(b) by 0 days.

(21) Appl. No.: 17/797,321

(22) PCT Filed: Feb. 10, 2020

(86) PCT No.: PCT/JP2020/005199
§ 371 (c)(1),
(2) Date: Aug. 3, 2022

(87) PCT Pub. No.: WO2021/161400
PCT Pub. Date: Aug. 19, 2021

(65) Prior Publication Data
US 2023/0057451 A1    Feb. 23, 2023

(51) Int. Cl.
*F03B 15/06*    (2006.01)
*H02P 9/00*    (2006.01)
(Continued)

(52) U.S. Cl.
CPC .............. *F03B 15/06* (2013.01); *H02P 9/007* (2013.01); *H02P 9/42* (2013.01); *H02P 2101/10* (2015.01)

(58) Field of Classification Search
CPC ......... H02P 9/007; H02P 9/42; H02P 2101/10
See application file for complete search history.

(56) References Cited

U.S. PATENT DOCUMENTS 4,708,594 A * 11/1987 Shinmei .................. F04B 49/20
                                                                417/42
4,743,827 A *  5/1988 Shiozaki ............... H02J 15/003
                                                                318/798
(Continued)

FOREIGN PATENT DOCUMENTS

EP    0320718 A1    6/1989
JP    2550089 B2   10/1996
(Continued)

OTHER PUBLICATIONS

International Search Report issued in corresponding International Patent Application No. PCT/JP2020/005199, filed Apr. 28. 2020, with English translation.
(Continued)

*Primary Examiner* — Pedro J Cuevas
(74) *Attorney, Agent, or Firm* — Rimon P.C.; Tomoki Tanida

(57) ABSTRACT

A variable speed pumping system includes a generator motor including a frequency converter, in which the variable speed pumping system, in the pumping mode, supply a power command to the generator motor to perform power control, and the power control correction signal generator adds a value obtained by multiplying a signal based on a difference between the power input command and an actual power input measured by a power detector in the pumping mode by a constant gain to a signal based on the deviation and inputs the added value to an integration control element to generate the power control correction signal based on an output signal of the integration control element.

1 Claim, 4 Drawing Sheets

(51) Int. Cl.
  *H02P 9/42* (2006.01)
  *H02P 101/10* (2015.01)

(56) References Cited

U.S. PATENT DOCUMENTS

| | | | | |
|---|---|---|---|---|
| 5,026,256 | A * | 6/1991 | Kuwabara | F03B 15/06 |
| | | | | 417/45 |
| 5,090,872 | A * | 2/1992 | Kuwabara | F04B 49/065 |
| | | | | 417/45 |
| 5,456,115 | A * | 10/1995 | Kuwabara | F04D 15/0027 |
| | | | | 73/659 |
| 5,561,358 | A * | 10/1996 | Kuwabara | H02P 9/42 |
| | | | | 290/40 C |
| 10,326,393 | B2 * | 6/2019 | Yoshida | F03B 13/06 |
| 10,436,109 | B2 * | 10/2019 | Apte | F01K 7/16 |
| 10,830,134 | B2 * | 11/2020 | Apte | F01K 23/10 |
| 11,655,759 | B2 * | 5/2023 | Apte | F02C 6/16 |
| | | | | 290/52 |
| 2018/0187597 | A1 * | 7/2018 | Apte | F01K 3/12 |
| 2018/0375452 | A1 * | 12/2018 | Yoshida | F03B 15/04 |
| 2020/0025076 | A1 * | 1/2020 | Apte | H02K 7/1823 |
| 2021/0054785 | A1 * | 2/2021 | Apte | F02C 1/10 |
| 2023/0296049 | A1 * | 9/2023 | Apte | F01K 23/10 |
| | | | | 290/52 |

FOREIGN PATENT DOCUMENTS

| | | |
|---|---|---|
| JP | H08-254175 A | 10/1996 |
| JP | 2000-102296 A | 4/2000 |

OTHER PUBLICATIONS

Extended European Search Report dated Dec. 5, 2023 issued in the corresponding European Patent Application No. 20918181.7.

* cited by examiner

VARIABLE SPEED PUMPING SYSTEMS

CROSS-REFERENCE OF RELATED APPLICATIONS

This application is the U.S. National Phase under 35 U.S.C. § 371 of International Patent Application No. PCT/JP2020/005199, filed on Feb. 10, 2020, the entire disclosure of which Application is incorporated by reference herein.

FIELD

The present invention relates to a variable speed pumping system, and particularly relates to a variable speed pumping system that enables an operation in which a power input monotonously and quickly follows a power input command to be close to the power input command in response to the power input command when a difference occurs between the power input command and an actual power input at a rotational speed according to a rotational speed command based on the power input command in a pumping mode, for example, when a deviation is generated by the influence of the pump turbine performance conversion error with respect to the rotational speed command, an increase in loss due to aging of the devices of the variable speed pumping system, or occurrence of a difference in a power input $P_M$ of each variable speed pumping system due to uneven flow distribution to each variable speed pumping system at the channel branch and an uneven input $P_P$ required by the pump turbine while a plurality of variable speed pumping systems shares the water conduit and/or the iron pipe conduit and/or the water discharge channel.

BACKGROUND

In contrast to a pumping mode of a variable speed pumping system, in a method in which a pump turbine is in charge of guide vane divergence control according to a power command and a head and a generator motor is in charge of power control to directly follow the power, including acceleration and deceleration to a rotational speed command based on a pumping power input command from the outside, a power response having relatively good followability to a change in a pumping power input command is obtained. Meanwhile, since a power control correction signal generator performs speed control to match the rotational speed with the rotational speed command, a control value corresponding to a difference between the power input command and the power input is accumulated in an integration control element in the power control correction signal generator until the rotational speed based on the power input command matches the rotational speed, and it is inevitable that a difference between the power input command and the actual power input is generated in a steady operation state in constant input command operation.

In a conventional variable speed pumping system, since a difference between a power input command and an actual power input in an operation in response to a rotational speed command based on the pumping power input command has not been considered, it has been inevitable that a difference between the power input command and the actual power input in an operation in response to a rotational speed command based on a pumping power input command is generated by the influence of the pump turbine performance conversion error with respect to the rotational speed command, an increase in loss due to aging of the devices of the variable speed pumping system, or occurrence of a difference in a power input $P_M$ of each variable speed pumping system due to uneven flow distribution to each variable speed pumping system at the channel branch and an uneven input $P_P$ required by the pump turbine while a plurality of variable speed pumping systems shares the water conduit and/or the iron pipe conduit and/or the water discharge channel.

Patent Literature 1 discloses a method in which a power control correction signal generator performs speed control to match a rotational speed with a rotational speed command in a pumping mode of a variable speed pumping system.

FIG. 3 is a diagram of a configuration of a variable speed pumping system disclosed in Patent Literature 1. In FIG. 3, a power system is denoted by 1. A generator motor is denoted by 2. The generator motor 2 rotationally drives a pump turbine 4 directly connected to a rotor. The generator motor 2 is supplied with an alternating-current (AC) excitation current adjusted by a power frequency converter 3 to a predetermined frequency according to a rotational speed N of the generator motor 2, and the generator motor 2 receives the alternating-current power having the same frequency, as that of the power system 1 to perform variable speed operation.

A speed detector is denoted by 5. The speed detector 5 measures the rotational speed N of the rotor and transmits a speed signal.

A rotational speed function generator for a power input command is denoted by 12. The rotational speed function generator 12 outputs an optimum rotational speed command $N_{OPT}$ based on a rotational speed function set by a power input command $P_O$ and a static head signal $H_{ST}$.

A subtractor is denoted by 18. The subtractor 18 outputs a difference between the optimum rotational speed command $N_{OPT}$ from the rotational speed function generator 12 and the rotational speed. N indicated by the speed signal from the speed detector 5 as a speed deviation signal.

A guide vane divergence function generator is denoted by 13. The guide vane divergence function generator 13 outputs a guide vane divergence command $Y_{OPT}$ based on a guide vane divergence function set according to the power input command $P_O$ and the static head signal $H_{ST}$.

A guide vane controller is denoted by 9. The guide vane controller 9 controls the guide vane divergence of the pump turbine 4 in response to the guide vane divergence command $Y_{OPT}$ from the guide vane divergence function generator 13.

A power control correction signal generator is denoted by 16. The power control correction signal generator 16 receives the speed deviation signal from the subtractor 18 and outputs a power control correction signal c by the function described later in detail with reference to the drawing showing a configuration example of the power control correction signal generator 16 of a variable speed pumping system in FIG. 4.

An adder is denoted by 19. The adder 19 adds the power control correction signal c from the power control correction signal generator 16 and the power input command $P_O$ and outputs it.

A power detector is denoted by 6. The power detector 6 measures a power input from the power system 1 to the generator motor 2 and outputs a measured value $P_M$. Hereinafter, $P_M$ is referred to as a power input.

A subtractor is denoted by 20. The subtractor 20 subtracts the power input $P_M$ from the power detector 6 from the output signal of the adder 19 and outputs it.

A power controller is denoted by 7. The power controller 7 outputs, in response to the output signal of the subtractor 20, a set frequency command of the AC excitation current according to the rotational speed N of the generator motor 2 to the power frequency converter 3.

FIG. 4 is a diagram showing a configuration example of the power control correction signal generator 16 of the variable speed pumping system shown in FIG. 3. Note that the subtractor 18 shown in FIG. 3 is also shown in FIG. 4 for convenience.

The power control correction signal generator 16 includes a multiplier 30, a multiplier 31 that is a proportional control element, an integration control element 32, a differential control element 33, an adder 34, an upper/lower limit value limiter function 35, and a multiplier 36.

The multiplier 30 multiplies a speed deviation signal ($N_{OPT}$–N) output from the subtractor 18 by a gain $1/N_0$ and outputs a dimensionless rotational speed deviation signal unitized per rated rotational speed $N_0$.

The multiplier 31 is a proportional control function of the proportional control element of the power control correction signal generator 16 and outputs a signal obtained by multiplying the dimensionless rotational speed deviation signal ($N_{OPT}$–N)/$N_0$ output from the multiplier 30 by a proportional gain $K_{PN}$.

The integration control element 32 performs integration by multiplying, the dimensionless rotational speed deviation signal ($N_{OPT}$–N)/$N_0$ output from the multiplier 30 by an integration gain $K_{IN}$.

The differential control element 33 performs inexact differential by multiplying the dimensionless rotational speed deviation signal ($N_{OPT}$–N)/$N_0$ output from the multiplier 30 by a differential gain $K_{DN}$ and outputs the value.

The adder 34 adds the output value of the multiplier 31, the output value of the integration control element 32, and the output value of the differential control element 33 and outputs it.

The upper/lower limit value limiter function 35 outputs a dimensionless power control correction signal value in which the output value of the adder 34 is limited to a predetermined upper/lower limit value in a range of –1.0 to 1.0.

The multiplier 36 multiplies the dimensionless power control correction signal value output from the upper/lower limit value limiter function 35 by the maximum power input $P_{MAX}$ of the generator motor 2 as a gain and outputs a power control correction signal ε that is the output value of the power control correction signal generator 16.

According to the variable speed pumping system disclosed in Patent Literature 1 having the configuration as shown in FIGS. 3 and 4, as described in lines 15 to 20 on page 6 in Patent Literature 1, $P_M=P_P$, and $P_O=P_F=P_M=P_O+ε$ if an error of the rotational speed function generator 12 is ignored, and the power control correction signal P eventually set to zero. As described above, the actual input $P_M$ can be controlled according to the power input command $P_O$ from the outside. Note that, in the above description of Patent Literature 1, input $P_P$ requested by the pump=power input $P_M$ is satisfied since the generated losses of the generator motor 2, the power frequency converter 3, and the like are also ignored.

CITATION LIST

Patent Literature

Patent Literature 1: JP 2550089 B

SUMMARY

Technical Problem

However, when the error of the rotational speed function generator 12 is generated by, for example, the influence of the pump turbine performance conversion error with respect to a rotational speed command, an increase in loss due to aging of the devices of the variable speed pumping system, or occurrence of a difference in a power input $P_M$ of each variable speed pumping system due to uneven flow distribution to each variable speed pumping system at the channel branch and an uneven input $P_P$ required by the pump turbine while a plurality of variable speed pumping systems shares the water conduit and/or the iron pipe conduit and/or the water discharge channel, power input command $P_O$–power input $P_M$=ε≠0 even if an optimum rotational speed command $N_{OPT}$ from the rotational speed function generator 12 and the speed signal from the speed detector 5 match with each other to be $N_{OPT}$–N=0, which causes a state in which a dimensionless power control correction signal value corresponding to the power control correction signal ε is accumulated in the integration control element 32 in the power control correction signal generator 16, and a state of power input command $P_O$≠ power input $P_M$ can possibly continue to occur.

FIG. 5 is a diagram showing an example of response analysis during input command change in a certain variable speed pumping system in which the configuration example of the power control correction signal generator 16 of FIG. 4 is app led to the variable speed pumping system of FIG. 3 while an error of the rotational speed function generator 12 occurs. FIG. 5 shows analysis results of power input command $P_O$/maximum power input. $P_{MAX}$, power input. $P_M$/maximum power input $P_{MAX}$, optimum rotational speed command $N_{OPT}$/rated rotational speed $N_0$, and rotational speed N/rated rotational speed. $N_0$ when power input command $P_O$/maximum power input value $P_{MAX}$ is sequentially changed stepwise from approximately 0.72 to 0.81 to 0.91 to 1.0.

FIG. 5 shows that optimum rotational speed command $N_{OPT}$/rated rotational speed $N_0$ and rotational speed N/rated rotational speed $N_0$ substantially match with each other in each step, but also shows that power input command $P_O$/maximum power input $P_{MAX}$ and power input $P_M$/maximum power input $P_{MAX}$ indicate a slight difference in each step, and that the state of power input command $P_O$≠power input $P_M$ continuously occurs as described above.

The present invention has been made in view of the above, and a purpose of the present invention is to provide a variable speed pumping system that enables an operation in which a power input monotonously and quickly follows a power input command to be close to the power input command in response to the power input command in a situation where a difference occurs between the power input command and an actual power input at a rotational speed according to a rotational speed command based on the power input command.

Solution to Problem

According to an aspect of the present invention, in order to solve the problems and achieve the purpose, there is provided a variable speed pumping system including: a generator motor including a frequency converter and a primary side synchronously connected to a commercial power system although a rotor rotates at a variable speed;

and a pump turbine directly connected to the rotor of the generator motor and configured to drive the generator motor in a power generation mode and to be driven by the generator motor in a pumping mode, wherein the variable speed pumping system is configured to, in the pumping mode, input to a power controller a value obtained by subtracting an actual power input from a value obtained by adding a power input command to a power control correction signal calculated by a power control correction signal generator based on a deviation between a rotational speed of the rotor and a rotational speed command calculated based on the power input command and supply a power command to the generator motor to perform power control, and the power control correction signal generator is configured to add a value obtained by multiplying a signal based on a difference between the power input command and an actual power input measured by a power detector in the pumping mode by a constant gain to a signal based on the deviation and input the added value to an integration control element to generate the power control correction signal based on an output signal of the integration control element.

Advantageous Effects of Invention

A variable speed pumping system according to the present invention has an effect of preventing a deviation from occurring between a power input command and an actual power input in a pumping mode.

DESCRIPTION OF EMBODIMENTS

Hereinafter, an embodiment of a variable speed pumping system according to the present invention be described in detail with reference to the drawings. Note that the present invention is not limited by the embodiment.

First Embodiment

Figure 3:
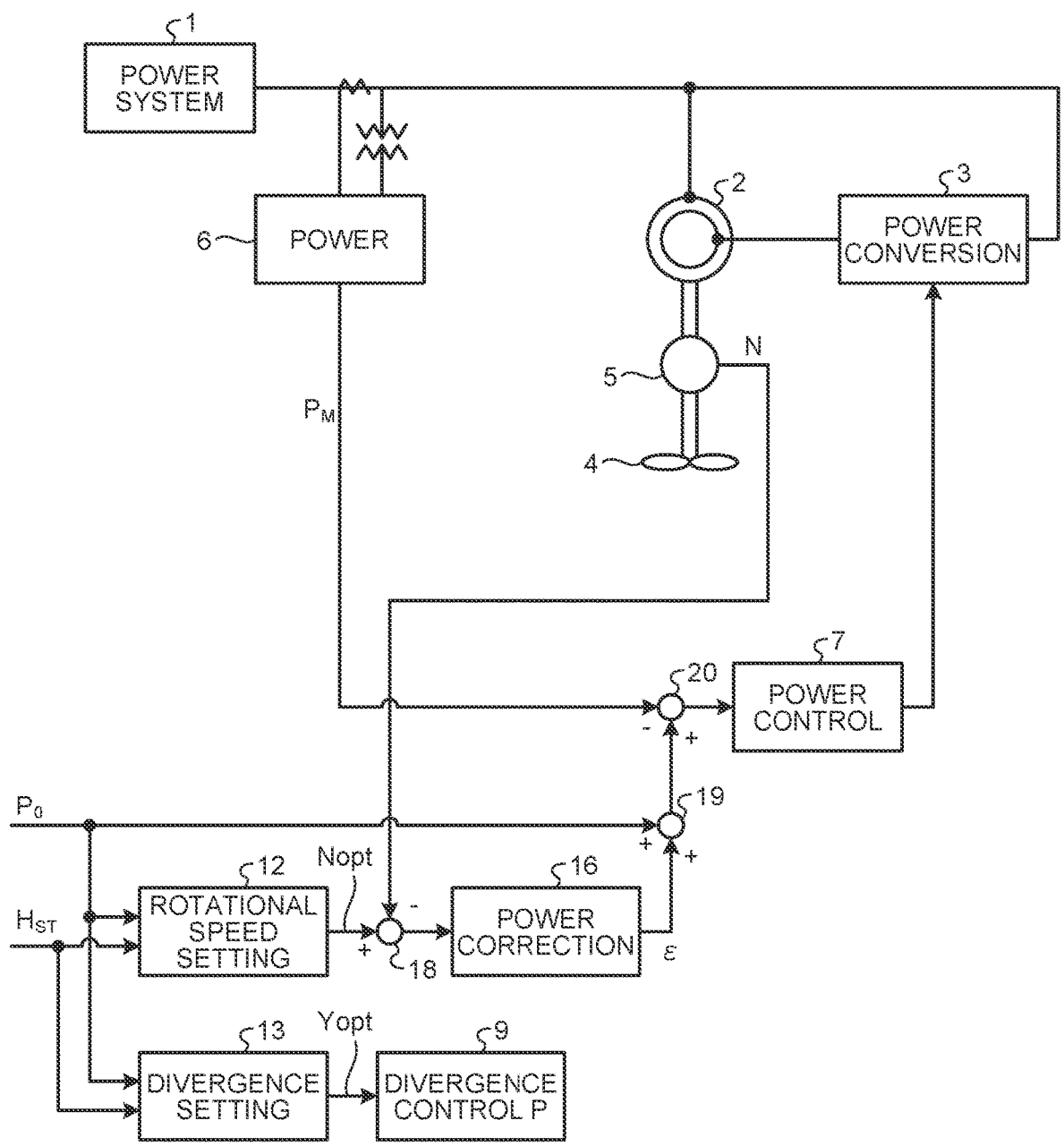
FIG. 3 is a configuration diagram of a conventional variable speed pumping system.

The overall configuration of a variable speed pumping system according to the present invention is similar to that of a conventional variable speed pumping system shown in FIG. 3. The variable speed pumping system according to the present invention differs from the conventional variable speed pumping system in a power control correction signal generator. That is, the variable speed pumping system according to the present invention has a configuration in which a power control correction signal generator 16 of the conventional variable speed pumping system shown in FIG. 3 is replaced with a power control correction signal generator 161 shown in FIG. 1. Therefore, the power control correction signal generator 161 will be described below.

Figure 1:
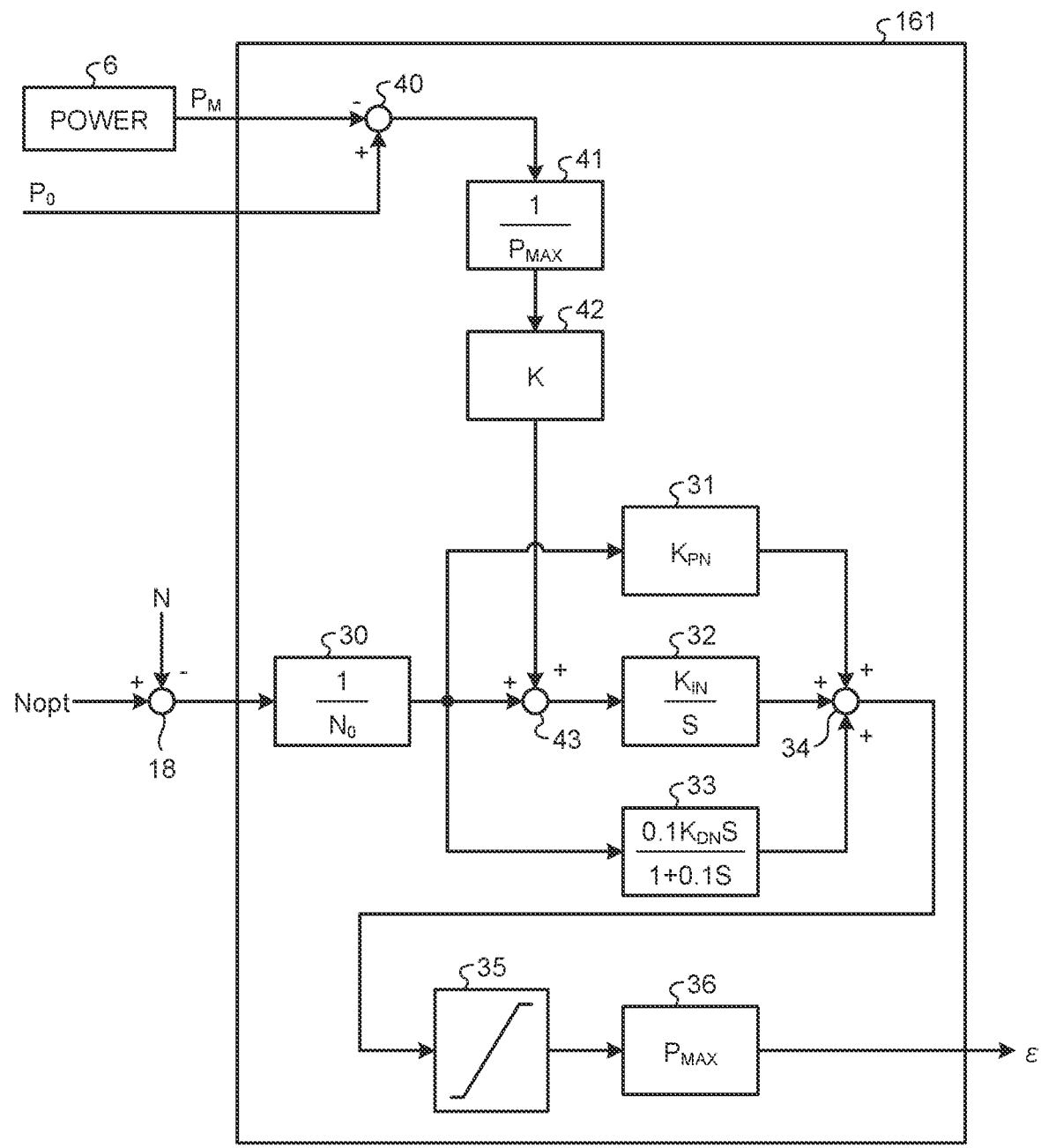
FIG. 1 is a diagram showing a configuration example of a power control correction signal generator of a variable speed pumping system according to the present invention.

FIG. 1 is a diagram showing a configuration example of the power control correction signal generator 161 of the variable speed pumping system according to the present invention. In FIG. 1, the same reference signs as those in FIGS. 3 and 4 used to describe the conventional example denote the same or corresponding parts. The parts denoted by the same reference signs as those in FIGS. 3 and 4 will not be described.

Figure 4:
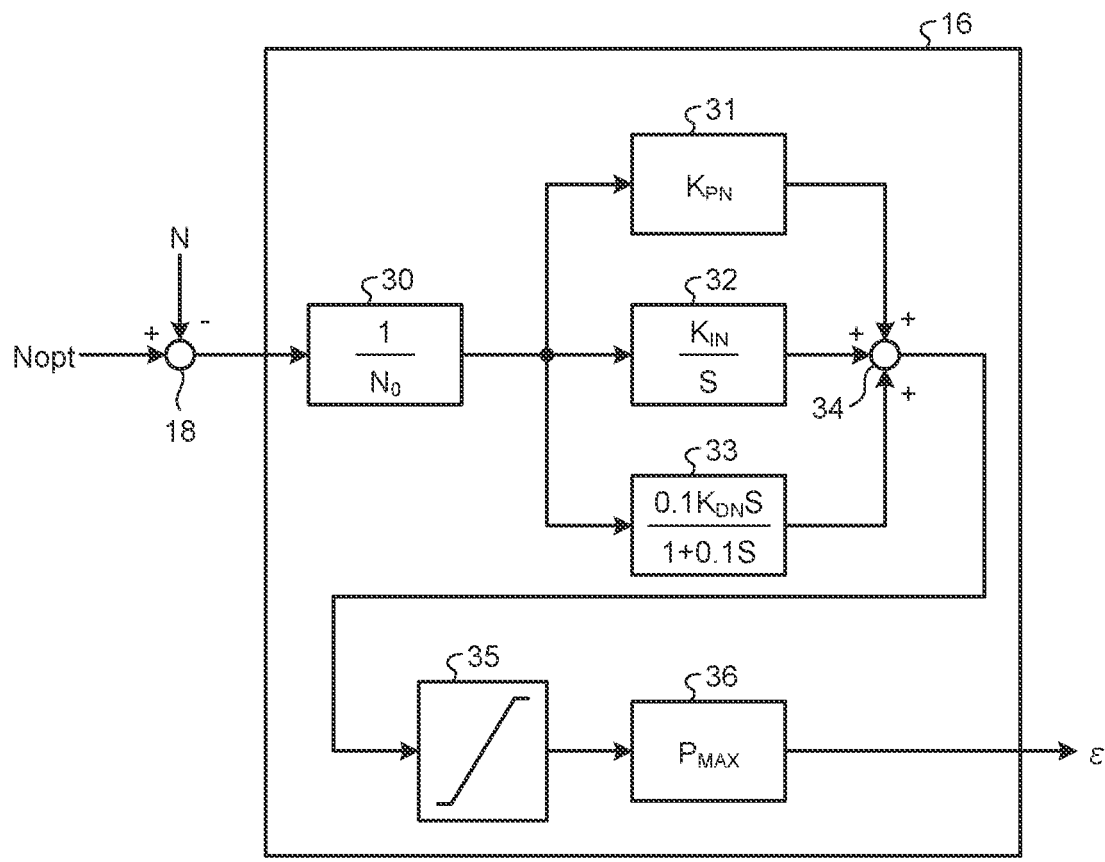
FIG. 4 is a diagram showing a configuration example of a power control correction signal generator of the conventional variable speed pumping system.

The power control correction signal generator 161 shown in FIG. 1 has a configuration in which an adder 43 is added to the input unit of the integration control element 32 of the power control correction signal generator 16 of the conventional variable speed pumping system shown in FIG. 4, a subtractor 40 subtracts and outputs a power input $P_M$, which is the output of the power detector 6, and a power input command $P_O$, a multiplier 41 multiplies the output value of the subtractor 40 by $1/P_{MAX}$ as a gain to make it dimensionless with a maximum power input $P_{MAX}$ and outputs it, a multiplier 42 multiplies the output value of the multiplier 41 by a control gain K and outputs it, and an adder 43 adds a dimensionless rotational speed deviation signal $(N_{OPT}-N)/N_0$ output from the multiplier 30 to the value output from the multiplier 42, and an integration control element 32 receives the value output from the adder 43.

In the power control correction signal generator 161, even if a difference between an optimum rotational speed command $N_{OPT}$, which is the speed deviation signal from the subtractor 18, and a speed signal N from the speed detector 5 becomes zero and the output signal $(N_{OPT}-N)/N_0$ of the multiplier 30 becomes zero, the output $(P_O-P_M)/P_{MAX} \times K$ of the multiplier 42 is added to the output signal $(N_{OPT}-N)/N_0$ of the multiplier 30 by the adder 43 and input to the integration control element 32 if the power input command $P_O$ (the output signal of the subtractor 40)–power input P is not zero. Therefore, the dimensionless power control correction signal value in the integration control element 32 is sequentially corrected with a value proportional to $(P_O-P_M)$, and the power control correction signal c that is the output signal of the power control correction signal generator 161 is also sequentially corrected with a value proportional to $(P_O-P_M)$ until $(P_O-P_M)$ reaches zero. Furthermore, since the rotational speed N is changed by correcting the power control correction signal s, which is the output signal of the power control correction signal generator 161, by the output $(P_O-P_M)/P_{MAX} \times K$ from the multiplier 42, optimum rotational speed command $N_{OPT}$ (output signal of the subtractor 18) rotational speed. N is also chanced, and is input to the multiplier 31, which is a proportional control element of the power control correction signal generator 161, and the integration control element. 32 to affect the power control correction signal ε. However, power input command $P_O$–power input $P_M$ is controlled to be zero in a steady state by feedback by $(P_O-P_M)/P_{MAX} \times K$ through the subtractor 40, the multiplier 41, and the multiplier 42.

Figure 2:
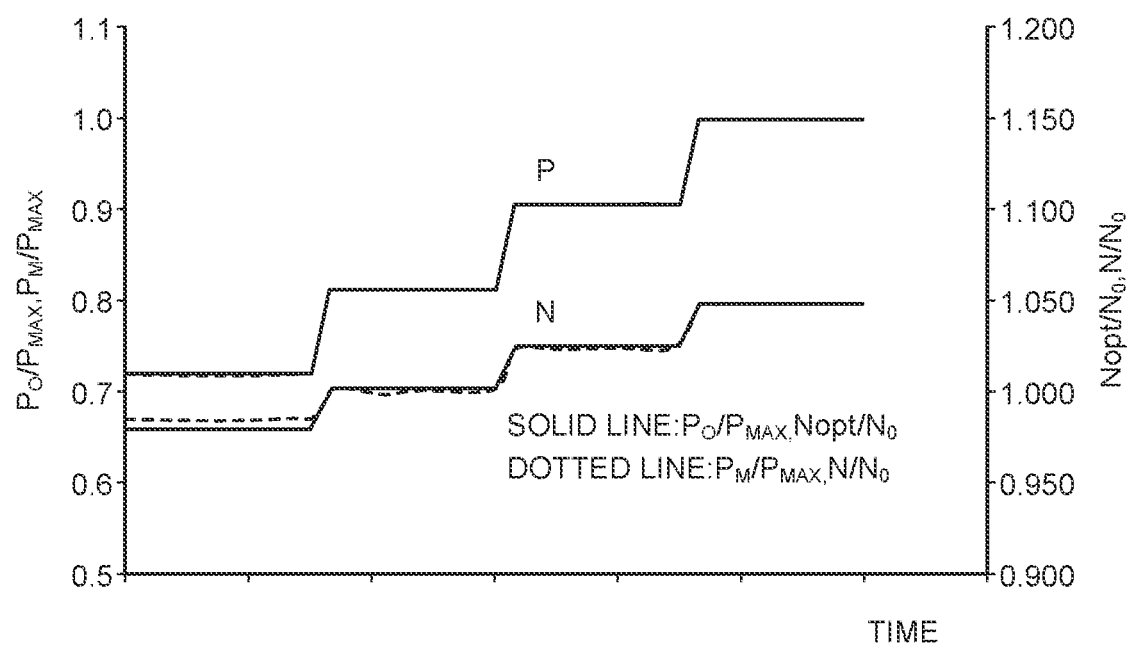
FIG. 2 is an example of analysis results of $P_O/P_{MAX}$, $P_M/P_{MAX}$, $N_{OPT}/N_0$, and $N/N_0$ when the power control correction signal generator of the variable speed pumping system according to the present invention is applied.
Figure 5:
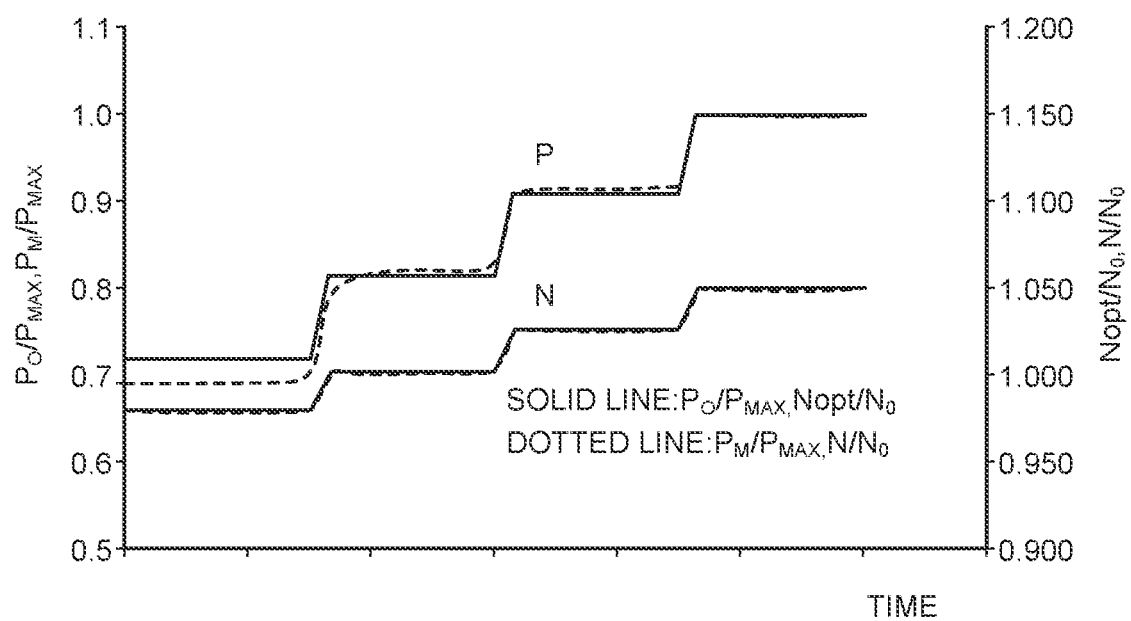
FIG. 5 is an example of analysis results of $P_O/P_{MAX}$, $P_M/P_{MAX}$, $N_{OPT}/N_0$, $N/N_0$ when the power control correction signal generator of the conventional variable speed pumping system is applied.

FIG. 2 is an example of response analysis during input command change in a certain variable speed pumping system in which the configuration example of the power control correction signal generator 161 shown in FIG. 1 is applied instead of the power control correction signal generator 16 shown in FIG. 4 in the same condition as that in the example of the response analysis during the input command in the certain variable speed pumping system in which the configuration example of the power control correction signal generator 16 shown in FIG. 4 is applied in the variable speed pumping system shown in FIG. 3 while the error of the rotational speed function generator 12 occurs as shown in FIG. 5. FIG. 2, similarly to FIG. 5, shows analysis results of power input command $P_O$/maximum power input $P_{MAX}$, power input $P_M$/maximum power input $P_{MAx}$, optimum rotational speed command $N_{OPT}$/rated rotational speed $N_0$, and rotational speed N/rated rotational speed $N_0$ when power input command $P_O$/maximum power input value $P_{MAx}$ is sequentially changed stepwise from approximately 0.72 to 0.81 to 0.91 to 1.0.

FIG. 2 shows that optimum rotational speed command $N_{OPT}$/rated rotational speed $N_0$ and rotational speed N/rated rotational speed $N_0$ indicate a slight difference in each step unlike FIG. 5, but also shows that power input command $P_O$/maximum power input value $P_{MAX}$ and power input $P_M$/maximum power input value $P_{MAX}$ substantially match with each other in each step, and that the state of power input command $P_O$=the power input $P_M$ is substantially achieved.

As described above, it is possible for the power control correction signal generator 161 according to the present embodiment to prevent the state of power input command $P_O \neq$ power input $P_M$ from continuously occurring, when a difference occurs between the power input command $P_O$ and the actual power input $P_M$ at the rotational speed according to the rotational speed command based on the power input command $P_O$ by adding a value obtained by multiplying a signal based on a difference between the power input command $P_O$ and the actual power input $P_M$ measured by the power detector 6 by a constant gain to a signal based on a difference between the optimum rotational speed command $N_{OPT}$, which is an input signal of the power control correction signal generator 161, and the rotational speed. N of the rotor, inputting the added signal to the integration control element 32 provided in the power control correction signal generator 161, and performing monotonous and prompt following control in response to the power input command of the actual power input of the generator motor 2. That is, it is possible to substantially achieve the state of power input command $P_O$=power input $P_M$ as the normal state.

REFERENCE SIGNS LIST

1 Power system
2 Generator motor
3 Power frequency converter
4 Pump turbine
5 Speed detector
6 Power detector
7 Power controller
9 Guide vane controller
12 Rotational speed function generator
13 Guide vane divergence function generator
16, 161 Power control correction signal generator
18, 20, 40 Subtractor
19, 34, 43 Adder
30, 31, 36, 41, 42 Multiplier
32 Integration control element
33 Differential control element
35 Upper/lower limit value limiter function

The invention claimed is:

1. A variable speed pumping system comprising:
a generator motor including a frequency converter and a primary side synchronously connected to a commercial power system although a rotor rotates at a variable speed; and
a pump turbine directly connected to the rotor of the generator motor and configured to drive the generator motor in a power generation mode and to be driven by the generator motor in a pumping mode,
wherein the variable speed pumping system is configured to, in the pumping mode, input to a power controller a value obtained by subtracting an actual power input from a value obtained by adding a power input command to a power control correction signal calculated by a power control correction signal generator based on a deviation between a rotational speed of the rotor and a rotational speed command calculated based on the power input command and supply a power command to the generator motor to perform power control, and
the power control correction signal generator is configured to add a value obtained by multiplying a signal based on a difference between the power input command and an actual power input measured by a power detector in the pumping mode by a constant gain to a signal based on the deviation and input the added value to an integration control element to generate the power control correction signal based on an output signal of the integration control element.

* * * * *